US011859634B2

(12) United States Patent
Robinson et al.

(10) Patent No.: US 11,859,634 B2
(45) Date of Patent: Jan. 2, 2024

(54) FAN HUB CONFIGURATION FOR AN ELECTRIC MOTOR ASSEMBLY

(71) Applicant: Regal Beloit America, Inc., Beloit, WI (US)

(72) Inventors: Jeevan Gnana Robinson, Fort Wayne, IN (US); Neha Kumari, North Sidney, OH (US); Yunpeng Yang, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 729 days.

(21) Appl. No.: 16/709,267

(22) Filed: Dec. 10, 2019

(65) Prior Publication Data

US 2021/0172453 A1 Jun. 10, 2021

(51) Int. Cl.

| | |
|---|---|
| ***F04D 29/32*** | (2006.01) |
| *F04D 19/00* | (2006.01) |
| *F04D 25/06* | (2006.01) |
| *F04D 29/38* | (2006.01) |
| *F04D 29/66* | (2006.01) |

(52) U.S. Cl.

CPC ......... *F04D 29/326* (2013.01); *F04D 29/329* (2013.01); *F04D 19/002* (2013.01); *F04D 25/0613* (2013.01); *F04D 29/384* (2013.01); *F04D 29/667* (2013.01); *F05D 2240/304* (2013.01)

(58) Field of Classification Search

CPC .... F04D 29/329; F04D 19/002; F04D 29/662; F05D 2230/64

See application file for complete search history.

(56) References Cited

U.S. PATENT DOCUMENTS

| | | | |
|---|---|---|---|
| D39,419 | S | 7/1908 | Snyder |
| 2,115,527 | A | 4/1938 | Hueglin |
| D131,669 | S | 3/1942 | Kisling |
| D176,891 | S | 2/1956 | Theisen |

(Continued)

FOREIGN PATENT DOCUMENTS

| | | | |
|---|---|---|---|
| CN | 201606274 | U | 10/2010 |
| CN | 202900765 | U | 4/2013 |

(Continued)

OTHER PUBLICATIONS

Extended European Search Report for Patent Application EP 20212427.7 dated Apr. 30, 2021; 8 pp.

(Continued)

*Primary Examiner* — Sabbir Hasan

(74) *Attorney, Agent, or Firm* — Armstrong Teasdale LLP

(57) ABSTRACT

A electric motor assembly includes an electric motor and a fan assembly coupled to the electric motor and configured to rotate therewith about an axis. The fan assembly includes a hub including a core ring, a first inner ring circumscribing the core ring, and a first plurality of circumferentially-spaced ribs extending between the core ring and the first inner ring. The hub also includes a second inner ring circumscribing the first inner ring and a second plurality of circumferentially-spaced ribs extending between the first inner ring and the second inner ring, and a plurality of circumferentially-spaced blades coupled to an outer periphery of the hub.

15 Claims, 12 Drawing Sheets

(56) References Cited

U.S. PATENT DOCUMENTS

| | | | |
|---|---|---|---|
| D231,355 | S | 4/1974 | Papst |
| 3,937,189 | A | 2/1976 | Beck |
| 4,523,434 | A | 6/1985 | Yoo |
| D324,201 | S | 2/1992 | Hannon et al. |
| D324,364 | S | 3/1992 | Hannon et al. |
| 5,326,225 | A | 7/1994 | Gallivan et al. |
| 5,423,660 | A | 6/1995 | Sortor |
| 5,466,120 | A | 11/1995 | Takeuchi et al. |
| D368,772 | S | 4/1996 | Liao |
| 6,118,198 | A | 9/2000 | Hollenbeck |
| 6,139,265 | A | 10/2000 | Alizadeh |
| 6,287,078 | B1 | 9/2001 | Min et al. |
| D453,960 | S | 2/2002 | Shelby et al. |
| D454,947 | S | 3/2002 | Wagner |
| 6,398,492 | B1 | 6/2002 | Cho et al. |
| 6,435,817 | B1 | 8/2002 | Hollenbeck et al. |
| D486,905 | S | 2/2004 | Wang |
| D507,343 | S | 7/2005 | Chiu et al. |
| D507,641 | S | 7/2005 | Chiu et al. |
| D509,583 | S | 9/2005 | Graham |
| D509,584 | S | 9/2005 | Li et al. |
| D513,799 | S | 1/2006 | Li et al. |
| 6,987,336 | B2 | 1/2006 | Streng et al. |
| D515,688 | S | 2/2006 | Li |
| 7,025,570 | B2 | 4/2006 | Jung et al. |
| 7,156,615 | B2 | 1/2007 | Horski et al. |
| 7,220,102 | B2 | 5/2007 | Cho et al. |
| D558,324 | S | 12/2007 | Hong |
| D559,968 | S | 1/2008 | Lee et al. |
| D560,789 | S | 1/2008 | Lee et al. |
| D561,888 | S | 2/2008 | Yang et al. |
| D564,653 | S | 3/2008 | Iwase et al. |
| D566,829 | S | 4/2008 | Parker et al. |
| D570,996 | S | 6/2008 | Harman et al. |
| D570,999 | S | 6/2008 | Harman et al. |
| D571,000 | S | 6/2008 | Bei et al. |
| D585,130 | S | 1/2009 | Harman et al. |
| D600,340 | S | 9/2009 | Parker et al. |
| 7,594,800 | B2 | 9/2009 | Teipen |
| D620,096 | S | 7/2010 | Underwood |
| D626,643 | S | 11/2010 | Situ et al. |
| D632,779 | S | 2/2011 | Spaggiari |
| D645,134 | S | 9/2011 | Lee et al. |
| D654,997 | S | 2/2012 | Spaggiari |
| 8,128,372 | B2 | 3/2012 | Best |
| 8,167,564 | B2 | 5/2012 | Streng et al. |
| 8,197,204 | B2 | 6/2012 | Aschermann et al. |
| D683,840 | S | 6/2013 | Rasmussen |
| D692,119 | S | 10/2013 | Rasmussen |
| D704,323 | S | 5/2014 | Rasmussen |
| 8,757,978 | B2 * | 6/2014 | Takeshita .............. F04D 29/662 416/185 |
| D715,904 | S | 10/2014 | Tate et al. |
| D725,257 | S | 3/2015 | Huang et al. |
| D726,897 | S | 4/2015 | Hatz |
| D727,490 | S | 4/2015 | Hatz |
| D750,211 | S | 2/2016 | Arai et al. |
| D755,363 | S | 5/2016 | Rasmussen |
| D755,945 | S | 5/2016 | Arai et al. |
| D755,946 | S | 5/2016 | Arai et al. |
| D755,947 | S | 5/2016 | Arai et al. |
| 9,494,162 | B2 | 11/2016 | Haaf et al. |
| D773,632 | S | 12/2016 | Panyasahabade |
| 9,651,054 | B2 | 5/2017 | Chang et al. |
| 9,803,649 | B2 | 10/2017 | Ragg et al. |
| D804,647 | S | 12/2017 | Chang et al. |
| D805,176 | S | 12/2017 | Avedon |
| D806,225 | S | 12/2017 | Chang et al. |
| D812,732 | S | 3/2018 | Murakami et al. |
| D829,878 | S | 10/2018 | Sallander |
| 10,260,508 | B2 | 4/2019 | Chang et al. |
| D854,143 | S | 7/2019 | Yu |
| D858,737 | S | 9/2019 | Tadokoro et al. |
| 10,428,830 | B2 | 10/2019 | Lee et al. |
| D886,275 | S | 6/2020 | Avedon |
| 10,731,658 | B2 * | 8/2020 | Inouchi ............... F04D 25/0613 |
| D898,182 | S | 10/2020 | Zhang |
| D910,834 | S | 2/2021 | Wang et al. |
| 11,060,528 | B2 * | 7/2021 | Neff ...................... F04D 29/329 |
| D930,808 | S | 9/2021 | Hsu |
| 2004/0212262 | A1 | 10/2004 | Chiu et al. |
| 2005/0074336 | A1 | 4/2005 | Li et al. |
| 2005/0186070 | A1 | 8/2005 | Zeng et al. |
| 2005/0232765 | A1 | 10/2005 | Watanabe et al. |
| 2005/0271529 | A1 | 12/2005 | Stommel et al. |
| 2006/0073018 | A1 | 4/2006 | Girod et al. |
| 2007/0020103 | A1 | 1/2007 | Spaggiari |
| 2007/0048138 | A1 | 3/2007 | Horski et al. |
| 2007/0274821 | A1 | 11/2007 | Yoshida |
| 2009/0155080 | A1 | 6/2009 | Yu |
| 2009/0191055 | A1 * | 7/2009 | Li ....................... F04D 25/0613 415/220 |
| 2011/0091315 | A1 | 4/2011 | Chang et al. |
| 2012/0057966 | A1 | 3/2012 | Chen et al. |
| 2012/0114498 | A1 | 5/2012 | Hsieh et al. |
| 2014/0064973 | A1 | 3/2014 | Ren et al. |
| 2016/0363132 | A1 | 12/2016 | Havel |
| 2017/0051758 | A1 | 2/2017 | Sun |
| 2017/0067486 | A1 | 3/2017 | Cho et al. |
| 2017/0211589 | A1 | 7/2017 | Murakami et al. |
| 2018/0112675 | A1 | 4/2018 | Neff et al. |
| 2018/0142708 | A1 | 5/2018 | Horng et al. |
| 2018/0245602 | A1 | 8/2018 | Stevens |
| 2018/0372113 | A1 | 12/2018 | Tyner et al. |
| 2019/0093669 | A1 | 3/2019 | Inouchi et al. |
| 2019/0145429 | A1 | 5/2019 | Ishida |
| 2019/0162201 | A1 | 5/2019 | Huang et al. |
| 2019/0195232 | A1 | 6/2019 | Sakurada et al. |
| 2019/0264708 | A1 | 8/2019 | Chang et al. |
| 2019/0389345 | A1 | 12/2019 | Kim |
| 2020/0116159 | A1 | 4/2020 | Yang et al. |
| 2020/0158129 | A1 | 5/2020 | Iwata et al. |

FOREIGN PATENT DOCUMENTS

| | | | | |
|---|---|---|---|---|
| CN | 205047519 | U | | 2/2016 |
| CN | 208073869 | U | | 11/2018 |
| CN | 209083612 | U | | 7/2019 |
| DE | 4215504 | A1 | | 11/1993 |
| EP | 0704625 | B1 | | 1/2003 |
| EP | 1732375 | B1 | | 8/2009 |
| EP | 2211444 | A2 | | 7/2010 |
| EP | 1897209 | B1 | | 8/2011 |
| EP | 2691654 | A1 | | 2/2014 |
| EP | 2696480 | A2 | | 2/2014 |
| EP | 2771581 | A1 | | 9/2014 |
| EP | 2691655 | B1 | | 5/2016 |
| EP | 3172447 | A1 | | 5/2017 |
| EP | 3274589 | A1 | | 1/2018 |
| EP | 3029336 | B1 | | 2/2018 |
| EP | 3498506 | A1 | | 6/2019 |
| JP | H03141900 | A | | 6/1991 |
| JP | H03141900 | A | * | 1/1997 |
| JP | H09317686 | A | | 12/1997 |
| JP | 2015108316 | A | | 6/2015 |
| WO | 2011038884 | A1 | | 4/2011 |
| WO | 2013110516 | A1 | | 8/2013 |
| WO | 2015000676 | A1 | | 1/2015 |
| WO | 2015075103 | A1 | | 5/2015 |
| WO | 2015124487 | A2 | | 8/2015 |

OTHER PUBLICATIONS

EPO Extended European Search Report for EP Patent Application 20210474.1 dated Jun. 29, 2021; 11 pp.

EPO Extended European Search Report for EP Patent Application 20212429.3 dated May 4, 2021; 8 pp.

Partial European Search Report for Application EP20210474.1 dated Apr. 21, 2021; 12 pp.

* cited by examiner

FAN HUB CONFIGURATION FOR AN ELECTRIC MOTOR ASSEMBLY

BACKGROUND

The following disclosure relates generally to electric motor assemblies and, more particularly, a fan shroud configuration for electric motor assemblies.

Electric motor assemblies are used in commercial refrigeration equipment, such as display cases, reach-in coolers, ice machines, and others to blow air for cooling products within the equipment. At least some known motor assemblies are relatively large with respect to the size of the equipment in which it is to be used and therefore limits placement of the motor assembly within the equipment and also the available space for products within the equipment. Additionally, at least some known motor assemblies channel a less than desired amount of air at a predetermined speed and static pressure, and are therefore less efficient. In order to channel the desired amount of air, some such known motor assemblies rotate at higher than desired speeds, which generates undesired noise.

BRIEF DESCRIPTION

In one example, a fan hub for use in a fan assembly configured to rotate about an axis is provided. The hub includes a core ring, a first inner ring circumscribing the core ring, and a first plurality of circumferentially-spaced ribs extending between the core ring and the first inner ring. The hub also includes a second inner ring circumscribing the first inner ring and a second plurality of circumferentially-spaced ribs extending between the first inner ring and the second inner ring.

In another example, an electric motor assembly is provided. The electric motor assembly includes an electric motor and a fan assembly coupled to the electric motor and configured to rotate therewith about an axis. The fan assembly includes a hub including a core ring, a first inner ring circumscribing the core ring, and a first plurality of circumferentially-spaced ribs extending between the core ring and the first inner ring. The hub also includes a second inner ring circumscribing the first inner ring and a second plurality of circumferentially-spaced ribs extending between the first inner ring and the second inner ring, and a plurality of circumferentially-spaced blades coupled to an outer periphery of the hub.

In yet another example, a method of balancing a fan assembly is provided. The method includes coupling a fan assembly to an electric motor such that the fan assembly is configured to rotate about an axis. The fan assembly includes a hub including a first inner ring, a second inner ring circumscribing the first inner ring, and a second plurality of circumferentially-spaced ribs extending between the first inner ring and the second inner ring. The method further includes removing a portion from at least one of the second plurality of ribs to facilitate balancing the fan assembly.

The features, functions, and advantages that have been discussed can be achieved independently in various examples of the present disclosure or may be combined in yet other examples, further details of which can be seen with reference to the following description and drawings.

DETAILED DESCRIPTION

The implementations described herein relate to an electric motor assembly for moving air in refrigeration equipment and other applications. The electric motor assembly includes an electric motor, a fan assembly coupled to the electric motor and configured to rotate therewith about an axis, and a shroud coupled to the electric motor and extending about the fan assembly. The shroud includes a central hub coupled to the electric motor, an inlet ring, and a plurality of arms extending between the central hub and the inlet ring. Each arm of the plurality of arms includes a curved radial portion extending from the central hub and a planar axial portion extending from the radial portion to the inlet ring. The fan assembly includes a hub including a cylindrical portion and an inlet surface coupled to an inlet end of the cylindrical portion. The fan assembly also includes a plurality of blades coupled to an outer periphery of the cylindrical portion, wherein the inlet surface is tapered to direct an inlet airflow toward the plurality of blades. An outlet end of the hub includes a core ring, a first inner ring circumscribing the core ring, and a first plurality of circumferentially-spaced ribs extending between the core ring and the first inner ring. The hub also includes a second inner ring circumscribing the first inner ring and a second plurality of circumferentially-spaced ribs extending between the first inner ring and the second inner ring.

The electric motor assembly described herein delivers an increased airflow at a higher efficiency with a lower noise level than other known air moving assemblies. The shroud arms are curved and swept in the direction of the airflow to allow the air to more easily pass through to reduce turbulence and improve efficiency. Also, the shroud arms are spaced to reduce blade tones. Similarly, the hub inlet surface is tapered to guide the incoming airflow into the blades at a predetermined angle to increase the amount of air flowing through the fan assembly. Additionally, the hub includes pluralities or ribs and rings that provide structural support to the fan assembly to maintain the fan assembly in position on the rotor and prevent vibrations to result in a reduced noise level. Moreover, the fan assembly is easily replaceable. Furthermore, the electric motor assembly described herein occupies a smaller volume than other known air moving assemblies and therefore allows a user to utilize smaller refrigeration equipment to take up less floor space. Additionally, the smaller size of the electric motor assembly described herein provides additional space within the refrigeration equipment to place products for sale.

Figure 1:
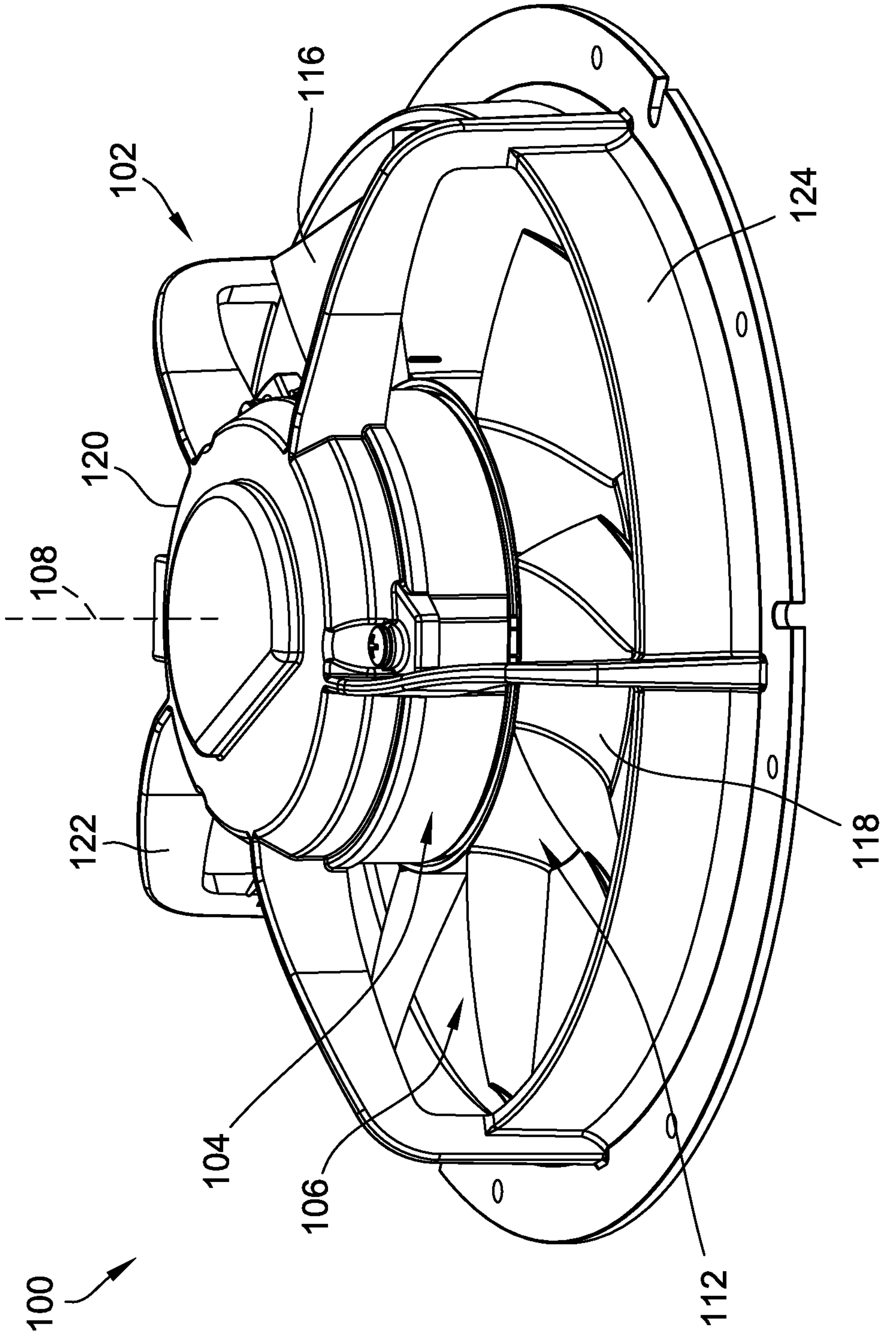
FIG. 1 is a perspective view of an exemplary electric motor assembly illustrating a shroud, an electric motor, and a fan assembly.
Figure 2:
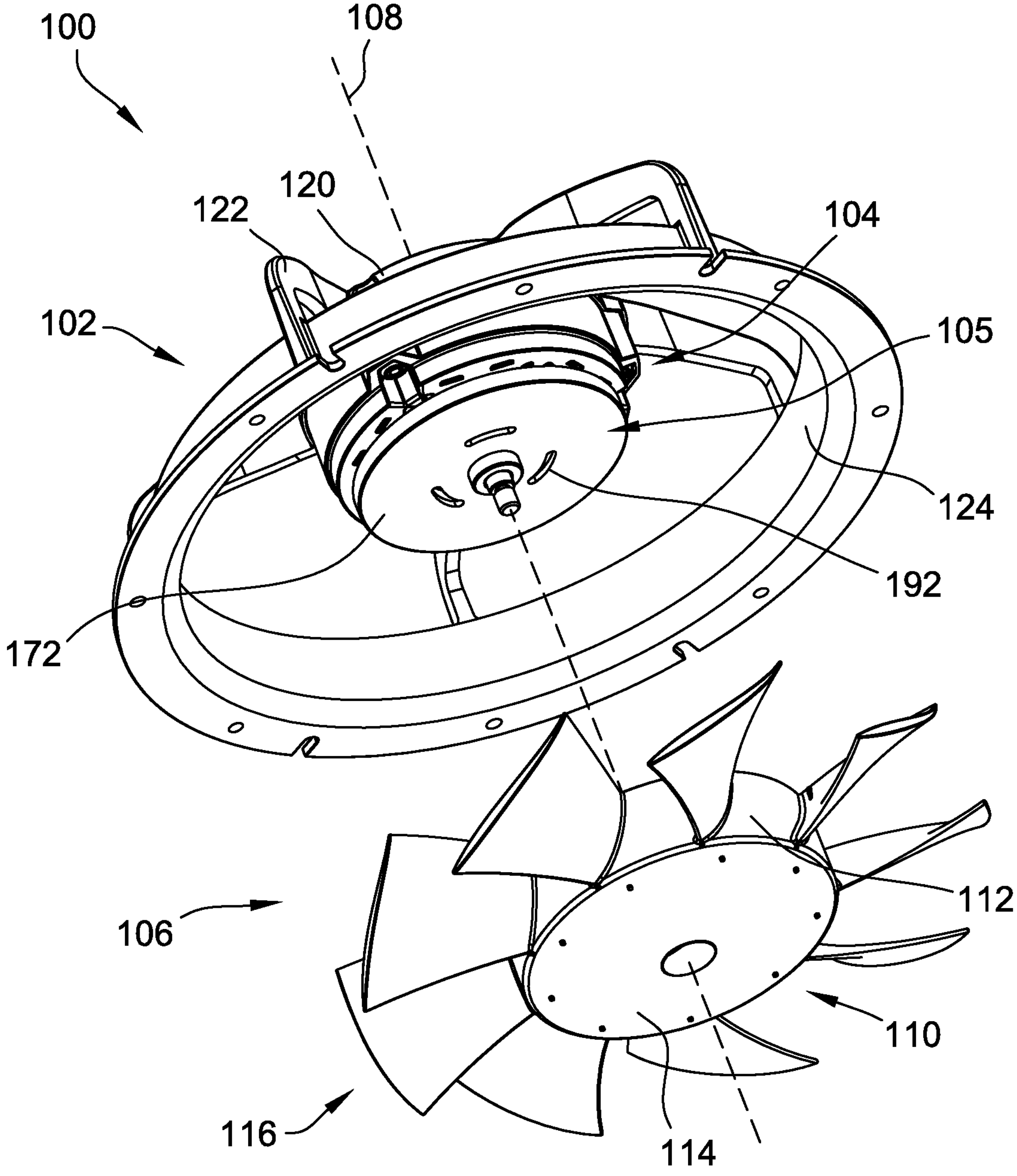
FIG. 2 is a partially exploded view of the electric motor assembly shown in FIG. 1 illustrating a rotor assembly of the electric motor.
Figure 3:
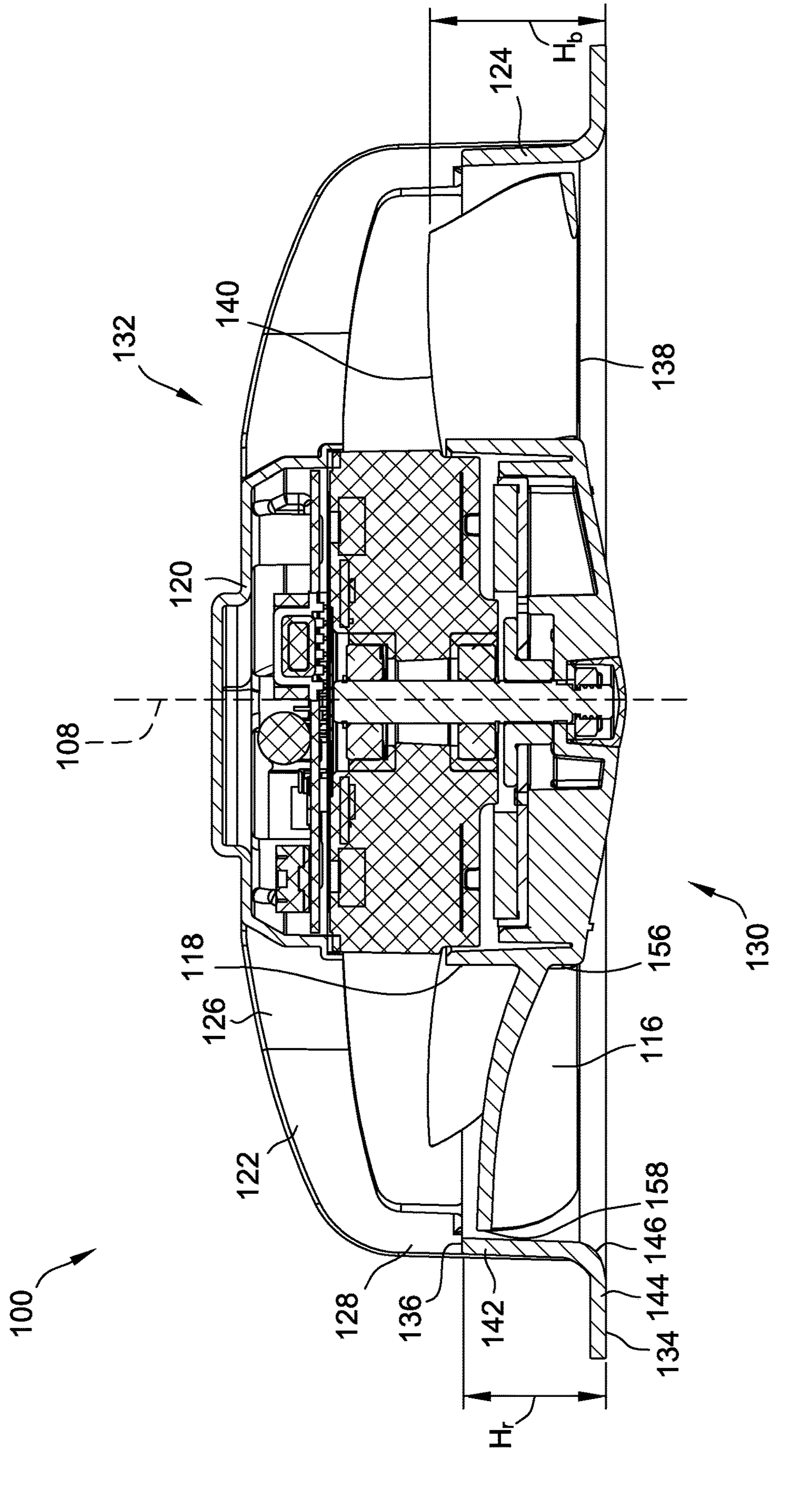
FIG. 3 is a cross-sectional view of the electric motor assembly shown in FIG. 1.
Figure 4:
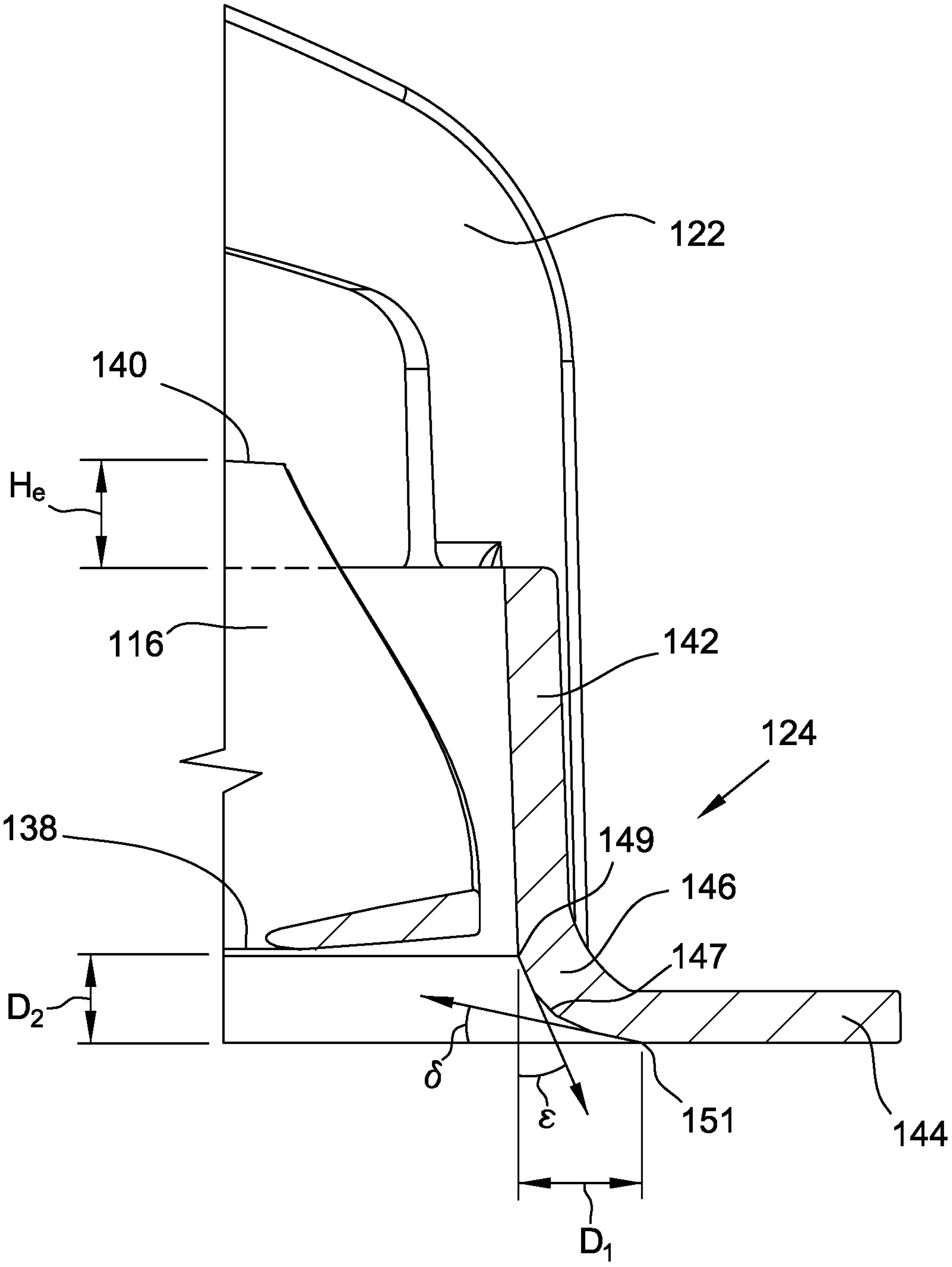
FIG. 4 is an enlarged view of a portion of the cross-sectional view shown in FIG. 3.

FIG. 1 is a perspective view of an exemplary electric motor assembly 100 illustrating a shroud 102, an electric motor 104, and a fan assembly 106. FIG. 2 is a partially exploded view of electric motor assembly 100 illustrating a rotor assembly 105 of electric motor 104. FIG. 3 is a cross-sectional view of electric motor assembly 100. FIG. 4 is an enlarged view of a portion of the cross-sectional view shown in FIG. 3. In the exemplary embodiment, shroud 102 is fixedly coupled to electric motor 104 and fan assembly 106 is rotatably coupled to electric motor 104 such that operation of electric motor 104 causes fan assembly 106 to rotate about a rotational axis 108. Fan assembly 106 includes a hub 110 having a cylindrical portion 112 and an inlet surface 114 coupled to cylindrical portion 112. Additionally, fan assembly 106 includes a plurality of circumferentially-spaced blades 116 coupled to and extending from an outer periphery 118 of cylindrical portion 112.

In the exemplary embodiment, shroud 102 includes a central hub 120, a plurality of arms 122, and an inlet ring 124. Arms 122 extend from central hub 120 to inlet ring 124 and are substantially s-shaped. That is, each arm 122 includes two curves as arm 122 extends radially away from central hub 120. More specifically, each arm 122 includes a radial portion 126 extending from central hub 120 and an axial portion 128 extending from radial portion 126 to inlet ring 124.

As best shown in FIG. 3, electric motor assembly 100 includes an inlet 130 defined by inlet ring 124 and an outlet 132 proximate radial portion 126 or arms 122. In operation, as fan assembly 106 rotates about axis 108, air is drawn into inlet 130 and is channeled through inlet ring 124 between blades 116, passed motor 104, and discharged at outlet 132. In the exemplary embodiment, inlet ring 124 includes an inlet end 134 and an opposing outlet end 136 that define an axial ring height Hr therebetween. Similarly, each blade 116 includes a leading edge 138 proximate inlet 130 and an opposing trailing edge 140 that define an axial blade height Hb therebetween. As shown in FIG. 3, trailing edge 140 of blades 116 is axially spaced from outlet end 136 of inlet ring 124. Specifically, blades 116 and inlet ring 124 are positioned to expose a predetermined amount of blade height Hb. In one embodiment, for example when fan assembly 106 includes a diameter of 8 inches, between approximately 17% and approximately 25% of blade height Hb is positioned axially between inlet ring outlet end 136 and a point along blade trailing edge 140 where blade height Hb is at a maximum. That is, the axial distance between an axial plane aligned with inlet ring outlet end 136 and the point along blade trailing edge 140 where blade height Hb is at a maximum defines an exposed blade height He (shown in FIG. 4) that is between approximately 17% and approximately 25% of blade height Hb. More specifically, the exposed blade height He is approximately 22% the distance of blade height Hb. In another embodiment, for example when fan assembly 106 includes a diameter of 7 inches, the axial distance between an axial plane aligned with inlet ring outlet end 136 and the point along blade trailing edge 140 where blade height Hb is at a maximum defines an exposed blade height He (shown in FIG. 4) that is between approximately 28% and approximately 34% of blade height Hb. More specifically, in such an embodiment, the exposed blade height He is approximately 31% the distance of blade height Hb. Positioning trailing edge 140 axially offset from outlet end 136 reduces tones that may be produced by blades 116 and also reduces the stall point of the airflow through the blades.

In the exemplary embodiment, as best shown in FIG. 4, inlet ring 124 includes an axial portion 142, a radial portion 144, and a transition portion 146 extending between axial portion 142 and radial portion 144. As shown in FIG. 4, axial portion 142 may be obliquely oriented with respect to axis 108 such that a diameter of inlet ring 124 narrows from inlet end 134 to outlet end 136. Alternatively, axial portion 142 is oriented parallel to axis 108 such that the diameter of inlet ring 124 is constant between ends 134 and 136. Furthermore, leading edge 138 of blades 116 is positioned entirely within axial portion 142 of inlet ring 124 such that leading edge 138 overlap only axial portion 142 and do not extend into transition portion 146. Such a configuration reduces noise generated by electric motor assembly 100 and also reduces the blade tones.

In the exemplary embodiment, transition portion 146 is designed to increase the surface area of inlet ring 124 that interacts with the airflow being channeled therethrough to increase the flow rate. Transition portion 146 is defined by the curved inlet surface 147 of inlet ring 124 at inlet 130 and defines a non-symmetrical fillet design. Specifically, inlet surface 147 is defined between a first transition point 149 and a second transition point 151. Transition point 149 represents the transition between axial portion 142 and transition portion 146. Similarly, transition point 151 represents the transition between radial portion 144 and transition portion 146. In the exemplary embodiment, inlet surface 147 extends a first distance D1 in the radial direction between transition points 149 and 151, as shown in FIG. 4. Similarly, inlet surface 147 extends a second distance D2 in the axial direction between transition points 149 and 151, as shown in FIG. 4. In the exemplary embodiment, radial distance D1 is greater than axial distance D2. More specifically, radial distance D1 is approximately 1.5 times the length of radial distance D2. Furthermore, as shown in FIG. 4, inlet surface 147 extends from transition point 149 in an oblique direction at an angle ε, and inlet surface 147 extends from transition point 151 in an oblique direction at an angle δ that is smaller than angle ε. Specifically, angle ε is between approximately 25 degrees and approximately 35 degrees. More specifically, angle ε is approximately 30 degrees. Similarly, angle δ is between approximately 10 degrees and approximately 20 degrees. More specifically, angle δ is approximately 15 degrees. As such, inlet surface 147 is a continuously curved spline line between transition points 149 and 151.

Figure 5:
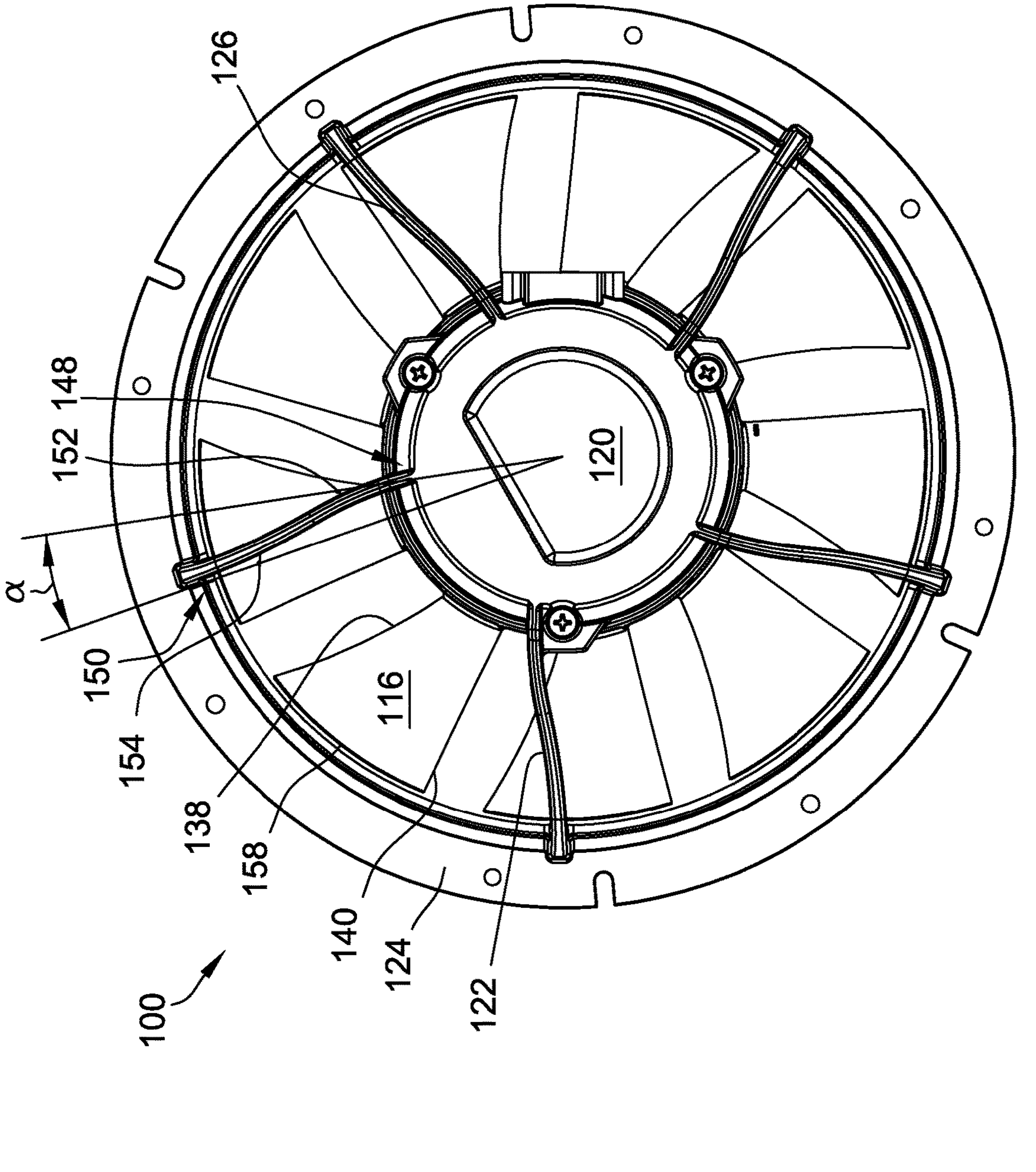
FIG. 5 is a top view of the electric motor assembly shown in FIG. 1.

FIG. 5 is a top view of electric motor assembly 100 illustrating the array of arms 122 of shroud 102. In the exemplary embodiment, radial portion 126 of arms 122 is substantially S-shaped and includes a plurality of curves, while axial portion 128 is substantially linear. Furthermore, radial portion 126 includes a first, inner end 148 coupled to central hub 120 and an opposing second, outer end 150 coupled to axial portion 128. In the exemplary embodiment, radial portion includes a radially inner first curved portion 152 extending from central hub 120 and a radially outer second curved portion 154 extending between first curved portion 152 and axial portion 128. Specifically, first curved portion 152 includes a radius of between approximately 4.0 inches and approximately 4.5 inches. More specifically, first curved portion 152 includes a radius of approximately 4.2 inches. Similarly, second curved portion 154 includes a radius of between approximately 6.6 inches and approximately 7.0 inches. More specifically, second curved portion 154 includes a radius of approximately 6.7 inches.

Furthermore, as shown in FIG. 5, radial portion 126 defines a sweep angle α of between approximately 10 degrees and approximately 15 degrees. More specifically, in the exemplary embodiment, radial portion 126 defines a sweep angle α of approximately 12 degrees. As used herein, the term "sweep angle" is meant to describe the portion of the circumference of a circle taken up between a radial line connecting the axis 108 and inlet end 148 of radial portion 126 and a radial line connecting axis 108 and outlet end 150 of radial portion 126.

The configuration resulting from the combination of curved portions 152 and 154 and the sweep angle α increases the structural integrity of shroud 102 and also facilitates smoothing the airflow past arms 122 to reduce airflow turbulence and, therefore, the noise level of electric motor assembly 100. Additionally, arms 122 are spaced about central hub 120 such that as one blade 116 begins to pass under one arm 122, an immediately adjacent blade 116 is clearing an immediately adjacent arm 122. Specifically, each blade 116 includes a root 156 that extends from hub periphery 118 and a tip 158 at the distal end of blade 116. When the leading edge 138 at the tip 158 of one blade 116 begins to overlap one arm 122, the trailing edge 140 at the tip 158 of an immediately adjacent blade 116 is ending its overlap with an immediately adjacent arm 122. Such a configuration further reduces overall noise and blade tones.

Figure 6:
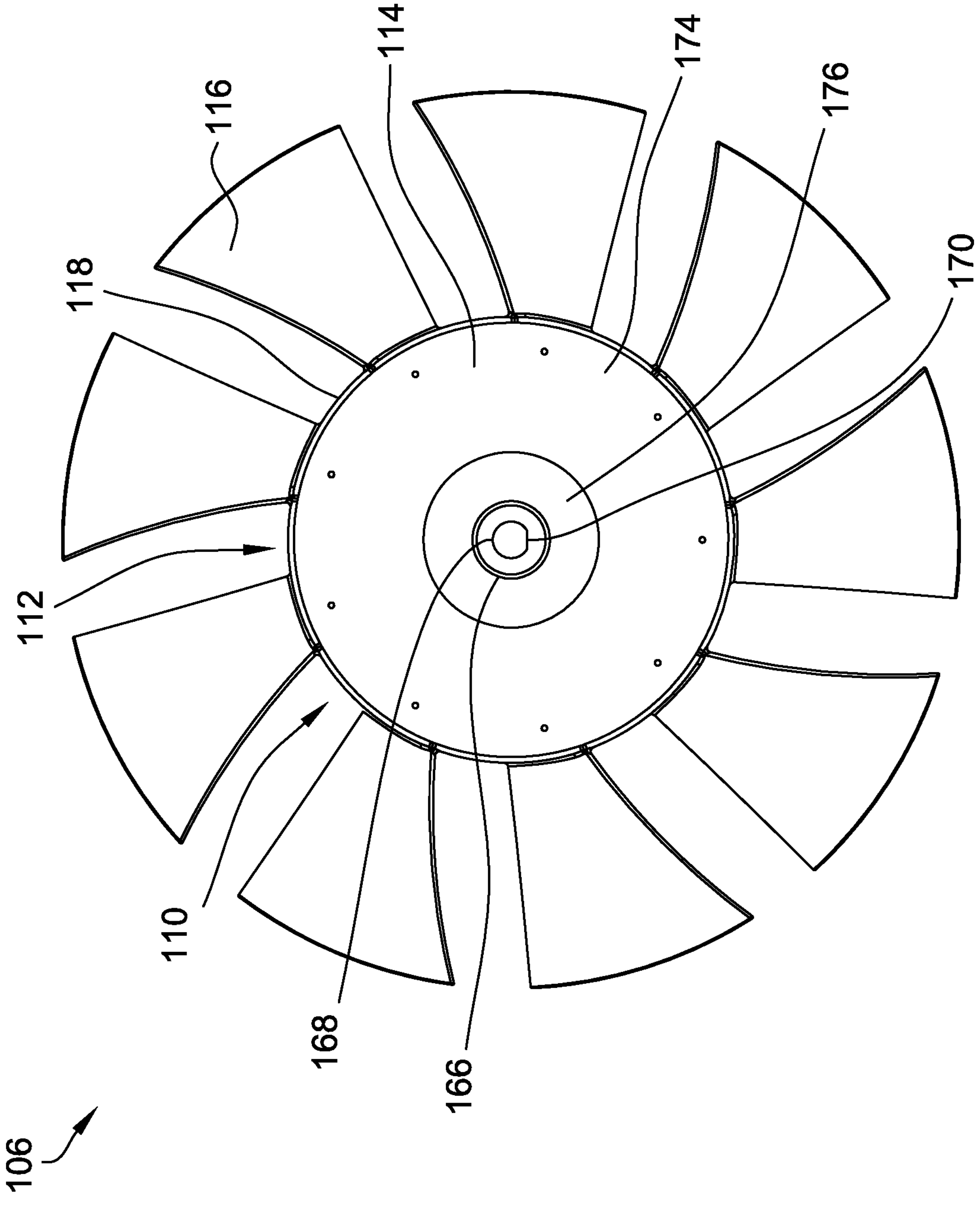
FIG. 6 is a top view of the exemplary fan assembly illustrating a hub and a plurality of blades.
Figure 7:
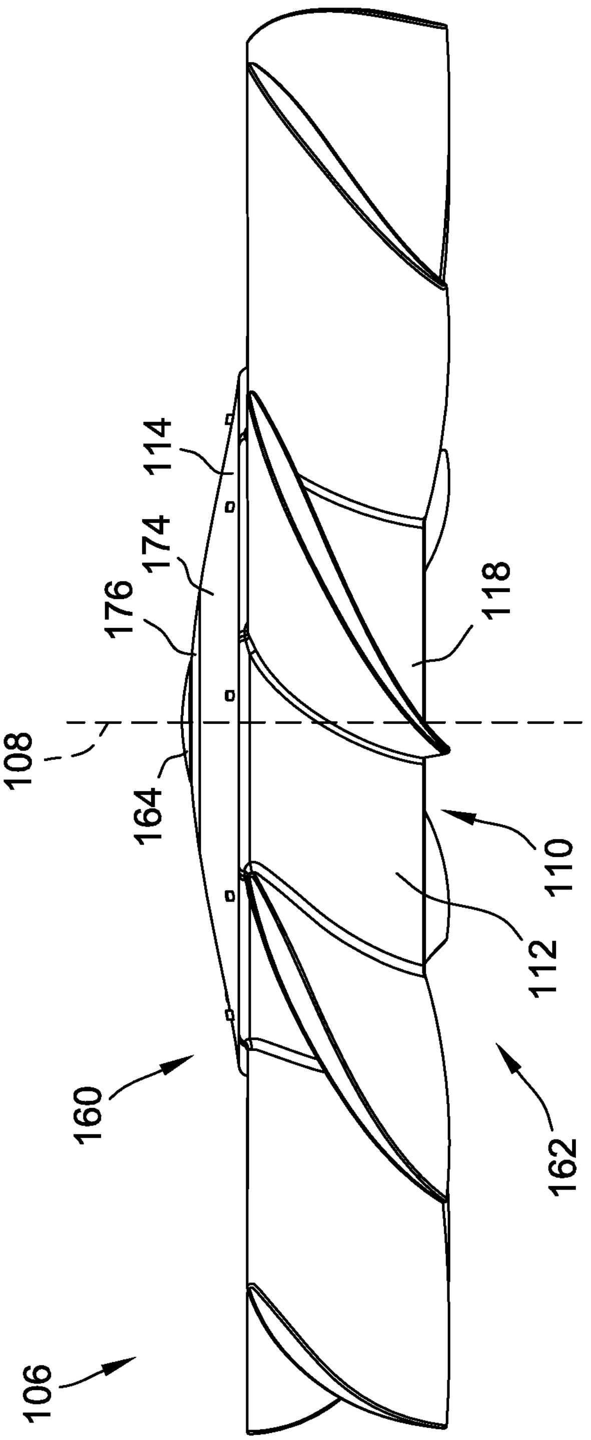
FIG. 7 is a side view of the fan assembly shown in FIG. 6.
Figure 8:
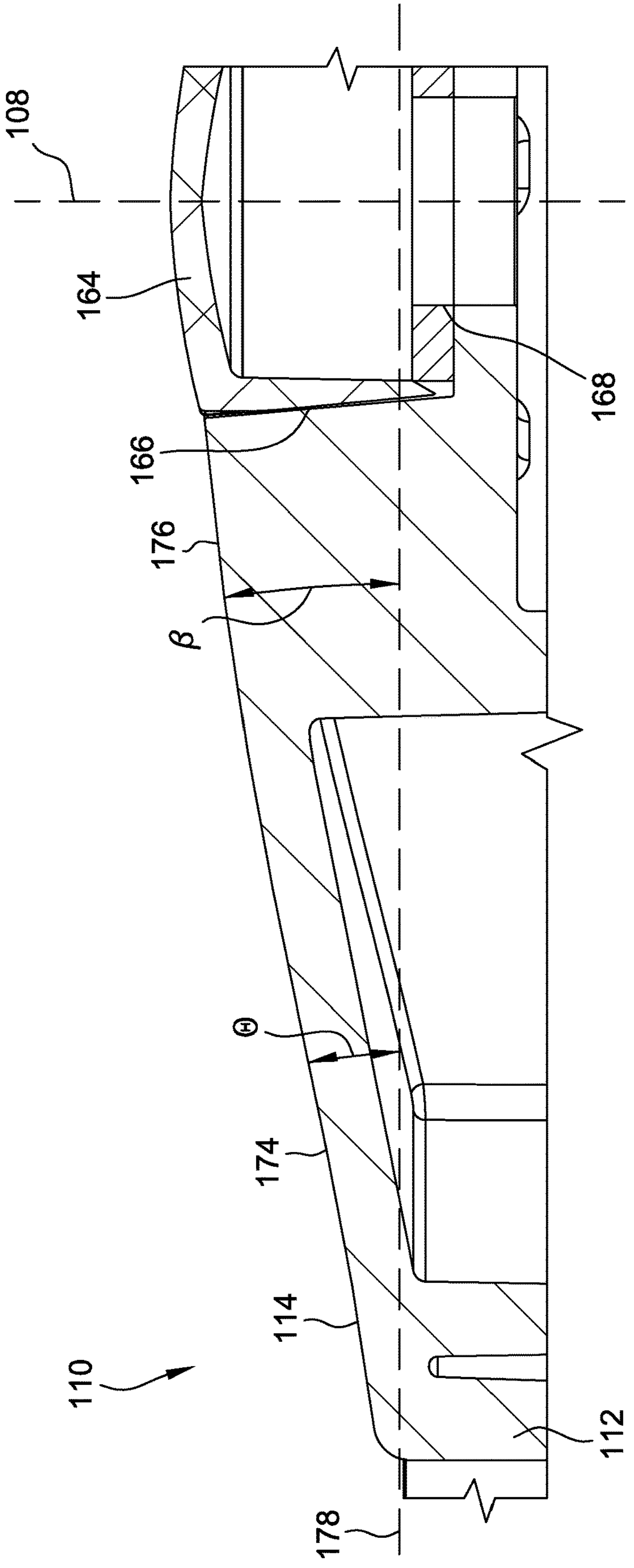
FIG. 8 is an enlarged, cross-sectional view of a portion of the fan assembly shown in FIG. 7.

FIG. 6 is a top view of fan assembly 106 illustrating hub 110 and plurality of blades 116. FIG. 7 is a side view of fan assembly 106. FIG. 8 is an enlarged view of a portion of fan assembly 100 shown in FIG. 7. In the exemplary embodiment, hub 110 includes cylindrical portion 112 having an inlet end 160 and an outlet end 162. Furthermore, hub 110 includes inlet surface 114 coupled to inlet end 160. As shown in FIGS. 6-8, inlet surface 114 is tapered to direct airflow toward leading edges 138 of blades 116. Such a configuration reduces the noise level and increases the airflow volume through fan assembly 106 for improved efficiency.

In the exemplary embodiment, fan assembly 106 also includes a hub cap 164 configured for insertion into a cap cavity 166 defined in inlet surface 114. Cavity 166 includes a central opening 168 having a planar portion 170. A threaded fastener (not shown), such as a bolt, is configured to be inserted through central opening 168 and a corresponding faster, such as a nut, is inserted into cavity 166 to secure fan assembly 106 to a rotor assembly 172 of electric motor 104. Hub cap 164 is inserted into cavity 166 to both secure the nut in place and also to eliminate turbulent airflow by providing a smooth transition to inlet surface 114. Hub cap 164 includes a planar surface (not shown) that aligns with planar portion 170 of central opening 168 to secure hub cap 164 to hub 110. Such a configuration prevents undesired removal of hub cap 164 from hub 110 and still allows hub cap 164 to be removed for replacement of fan assembly 106.

In the exemplary embodiment, inlet surface 114 includes a first portion 174 extending obliquely from inlet end of cylindrical portion 112 and a second portion 176 extending obliquely from first portion 174. As shown in FIGS. 6-8, first surface 174 circumscribes second portion 176. As best shown in FIG. 8, first portion 174 is oriented at a first angle θ with respect to a plane 178 perpendicular to axis 108. Similarly, second portion 176 is oriented at a second angle β with respect to plane 178. In the exemplary embodiment, first angle θ is greater than second angle β. Specifically, first angle θ of first portion 174 is oriented between approximately 5 degrees and approximately 10 degrees with respect to plane 178. More specifically, first angle θ of first portion 174 is oriented approximately 7 degrees with respect to plane 178. Similarly, second angle β of second portion 176 is oriented between approximately 2 degrees and approximately 5 degrees with respect to plane 178. More specifically, second angle β of second portion 176 is oriented approximately 3 degrees with respect to plane 178. Such a configuration provides for a smooth transition of airflow across inlet surface 114 and into blades 116.

Figure 9:
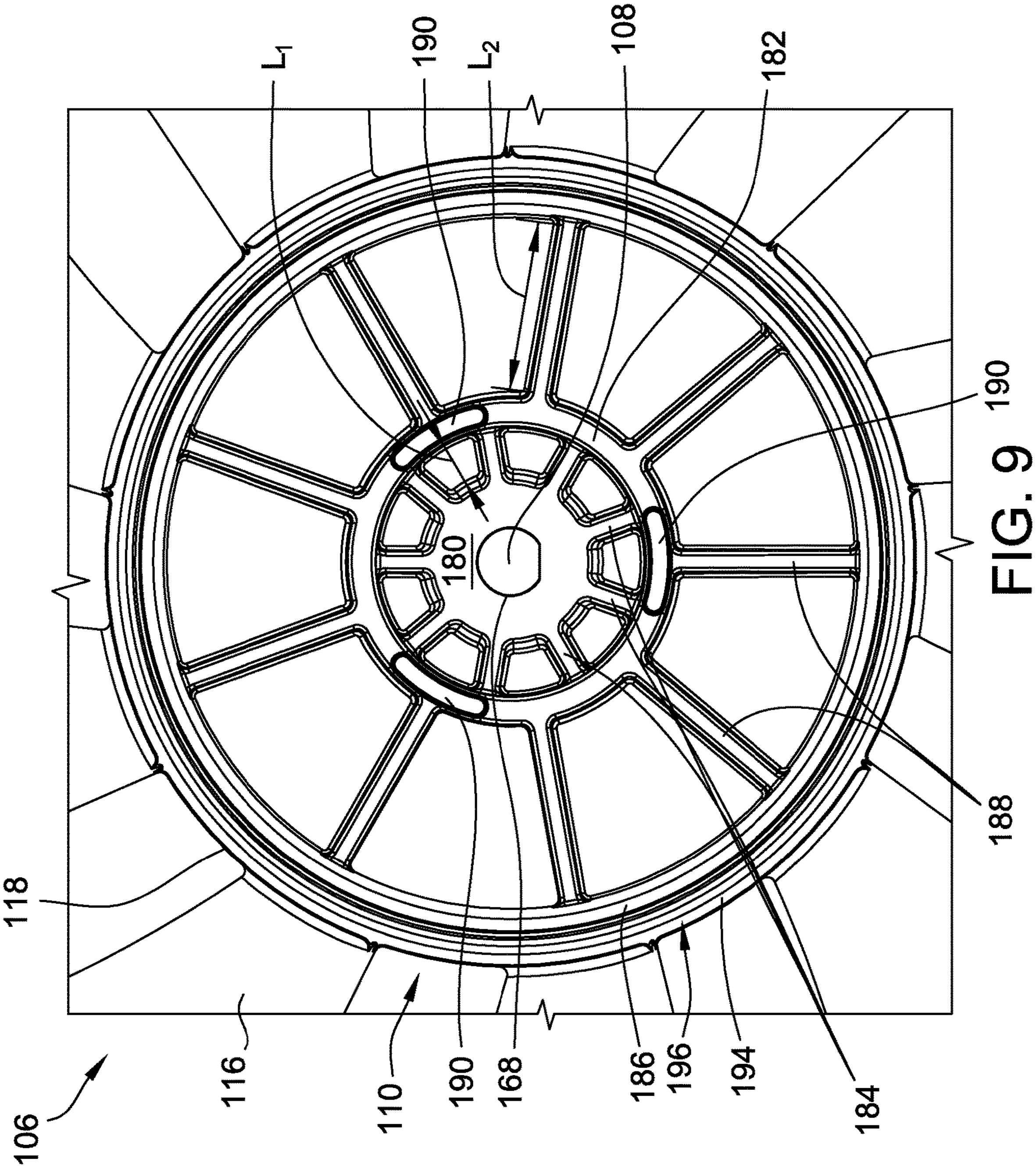
FIG. 9 is a bottom view of the hub of the fan assembly shown in FIG. 7.
Figure 10:
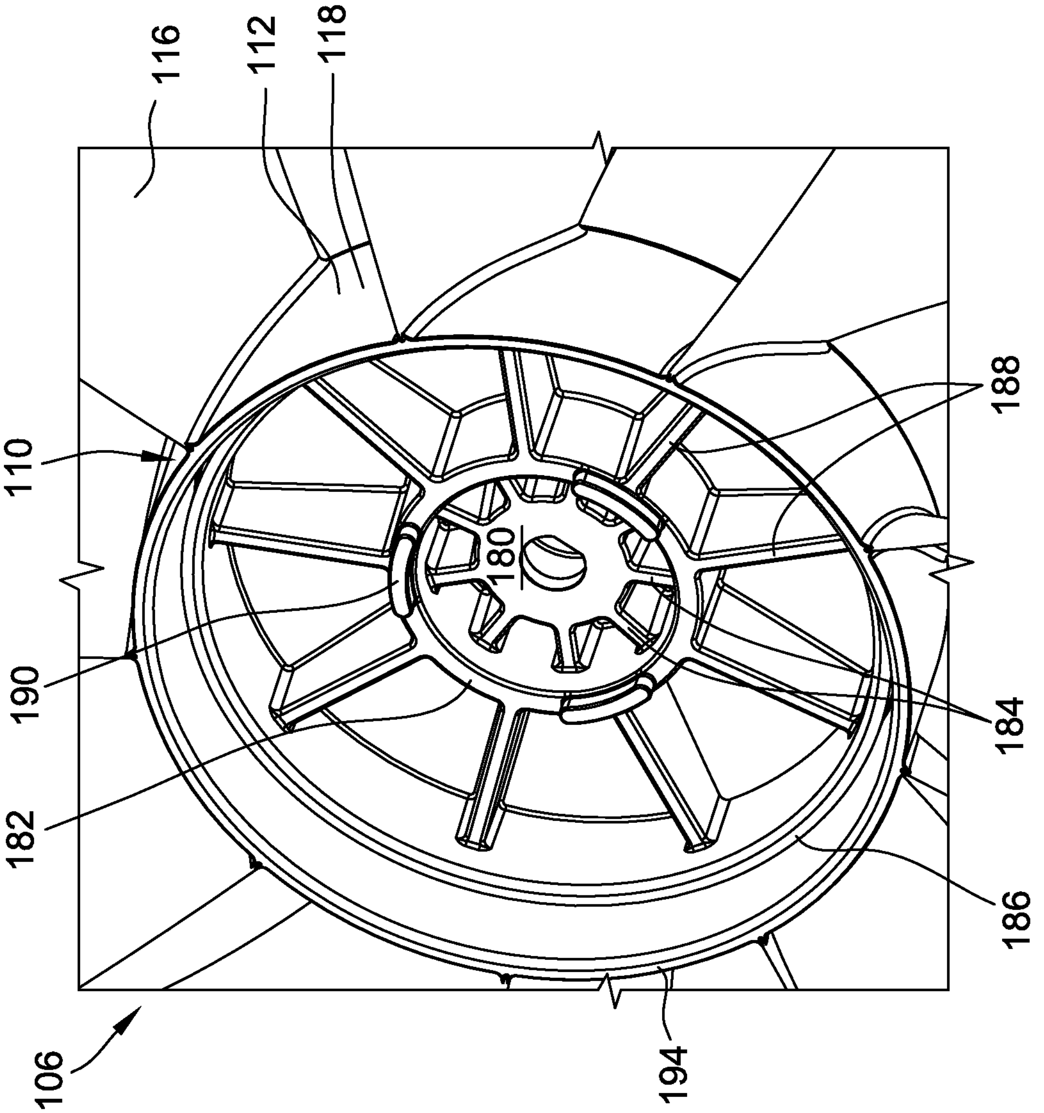
FIG. 10 is a bottom perspective view of the hub of the fan assembly shown in FIG. 7.
Figure 11:
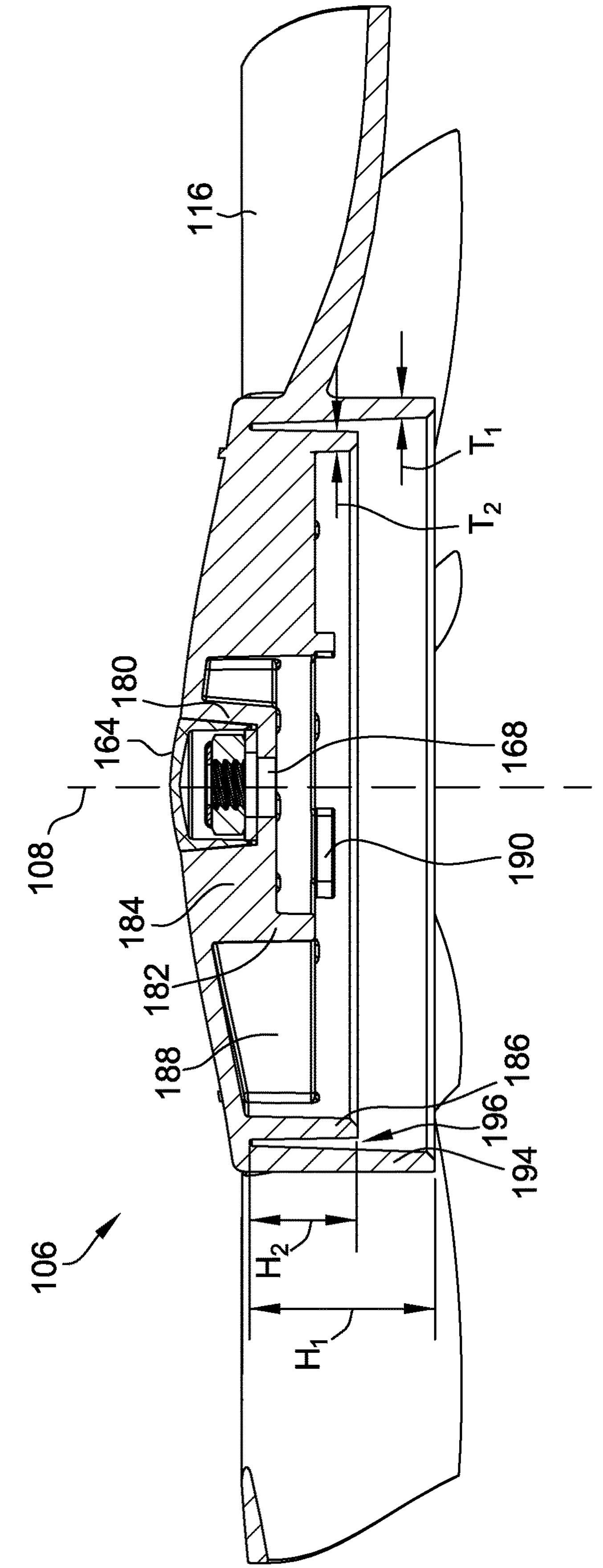
FIG. 11 is a cross-sectional view of the fan assembly shown in FIG. 7.

FIG. 9 is a bottom view of outlet end 162 of hub 110. FIG. 10 is a perspective view outlet end 162. FIG. 11 is a cross-sectional view of the fan assembly shown in FIG. 1*n* the exemplary embodiment, hub 110 includes a core ring 180, a first inner ring 182 circumscribing core ring 180, and a first plurality of circumferentially-spaced ribs 184 extending radially between core ring 180 and first inner ring 182. Additionally, hub 110 includes a second inner ring 186 circumscribing first inner ring 182 and a second plurality of circumferentially-spaced ribs 188 extending between first inner ring 182 and second inner ring 186. As such, second plurality of ribs 188 are positioned radially outward of first plurality of ribs 184.

In the exemplary embodiment, the quantity of ribs in first plurality of ribs 184 is equal to the quantity of ribs in second plurality of ribs 188. Furthermore, the quantity of blades 116 of fan assembly 106 is equal to the quantity of rib in both first and second pluralities 184 and 188. More specifically, in one embodiment, each rib 188 is radially aligned with a circumferential midpoint of a corresponding blade along outer periphery 118.

As best shown in FIG. 9, first plurality of ribs 184 define a first radial length L1, and second plurality of ribs 188 define a second radial length L2 that is longer than the first radial length L1. Specifically, the second radial length L2 is at least twice as long as first radial length L1. Furthermore, first plurality of ribs 184 is circumferentially offset from second plurality of ribs 188. Specifically, each rib of first plurality of ribs 184 is connected to first inner ring 182 approximately midway between adjacent ribs of second plurality of ribs 188. In operation, pluralities of ribs 184 and 188 provide structural reinforcement to maintain fan assembly 106 parallel to rotor assembly 172 by distributing loads from the shaft (not shown) of electric motor 104 evenly among blades 116.

In the exemplary embodiment, second plurality of ribs 188 are deformable to facilitate balancing fan assembly 106. That is, a portion of at least one rib 188 can be removed from to balance fan assembly 106 and maintain its position parallel to rotor assembly 172. In one embodiment, material can be removed from at least one rib 188 by carving blade 188 with a tool. In another embodiment, each rib 188 includes score marks that removal or predetermined portions of rib 188 as needed to balance fan assembly 106. As such, material is removed from fan assembly 106 to facilitate balancing rather than adding weights or other counterbalancing devices that may not be available.

As shown in FIGS. 8 and 9, first inner ring 182 includes at least one alignment device 190 extending axially therefrom. Specifically, first inner ring 182 includes a plurality of alignment devices 190 equally spaced about first inner ring 182 and configured to mate with a respective one of a plurality of alignment openings 192 (shown in FIG. 2) on rotor assembly 172. Alignment devices 190 engage alignment openings 192 to facilitate attaching fan assembly 106 to motor 104 and to distribute rotational loads from rotor assembly 172.

In the exemplary embodiment, hub 110 also includes an outer ring 194 that circumscribes second inner ring 186 to define a radial gap 196 therebetween. Gap 194 forms a continuous circle around second inner ring 186 and is configured to receive at least one balancing weight for balancing fan assembly 106. By either removing material from second plurality of ribs 188 or adding a weight to gap 196, or both, the balance of fan assembly 106 can be adjusted without adding weights to blades 116 or outer periphery 118 of hub 110 to maintain a clean visual appearance of fan assembly 106.

Outer ring 194 forms a portion of cylindrical portion 112 and outer periphery 118 of hub 110. Specifically, outer ring 194 includes an axial height H1 that is equal to the axial length of cylindrical portion 112. Additionally, as shown in FIG. 11, second inner ring 186 includes an axial height H2 that is less than axial height H1 of outer ring 194. Furthermore, as shown in FIG. 11, outer ring 194 includes a first radial thickness T1, and second inner ring 186 includes a second radial thickness T2 that is substantially similar to first radial thickness T1.

Figure 12:
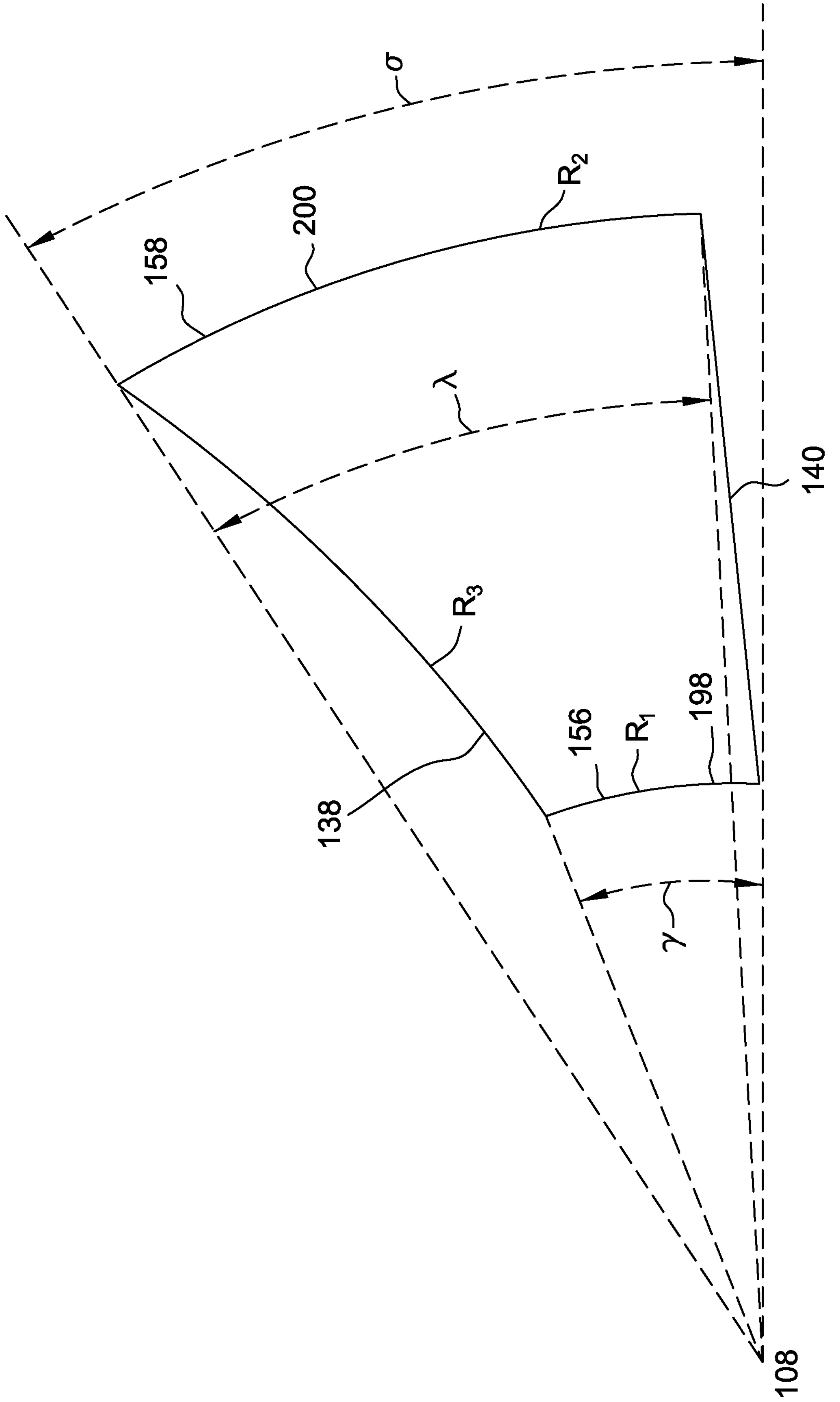
FIG. 12 is a top view of an exemplary blade of the fan assembly shown in FIG. 7.

FIG. 12 is a top view of blade 116 of fan assembly 106. In the exemplary embodiment, blade 112 is defined by leading edge 138, trailing edge 140, inner profile 198 extending between edges 138 and 140 at root 156, and outer profile 200 extending between edges 138 and 140 at tip 140. As shown in FIG. 12, inner profile 198 is defined by a curve having a radius R1, and outer profile 200 is defined by a curve having a radius R2 that is larger than radius R1. Specifically, radius R2 of outer profile 200 is approximately twice as large as radius R1 of inner profile 198. More specifically, radius R1 of inner profile 198 is between approximately 40 millimeters (mm) and approximately 60 mm. Even more specifically, radius R1 of inner profile 198 is approximately 50 mm. Similarly, radius R2 of outer profile 200 is between approximately 90 mm and approximately 110 mm. Even more specifically, radius R2 of outer profile 200 is approximately 100 mm.

Furthermore, in the exemplary embodiment, inner profile 198 defines a sweep angle $\gamma$ of between approximately 18 degrees and approximately 24 degrees along root 156 between edges 138 and 140. More specifically, inner profile 198 defines a sweep angle $\gamma$ of approximately 21 degrees. Similarly, outer profile 200 defines a sweep angle $\lambda$ of between approximately 28 degrees and approximately 32 degrees along tip 158 between edges 138 and 140. More specifically, outer profile 200 defines a sweep angle $\lambda$ of approximately 30 degrees. As such, the sweep angle $\lambda$ of outer profile 200 is greater than sweep angle $\gamma$ of inner profile 198. Overall, blade 116 defines a sweep angle $\sigma$ of between approximately 30 degrees and approximately 35 degrees from tip 158 of leading edge 138 to root 156 of trailing edge 140. More specifically, blade 116 defines a sweep angle $\sigma$ of approximately 33 degrees from tip 158 of leading edge 138 to root 156 of trailing edge 140. As used herein, sweep angle is meant to describe the portion of the circumference of a circle taken up between radial lines connected at axis 108.

In the exemplary embodiment, trailing edge 140 is substantially planar between inner profile 198 and outer profile 200. Leading edge 138 includes a radius R3 of between approximately 165 mm and approximately 175 mm between inner profile 198 and outer profile 200. More specifically, leading edge 138 includes a radius R3 of approximately 170 mm between inner profile 198 and outer profile 200.

Additionally, in the exemplary embodiment, blade 116 includes a pressure side, a suction side, and a blade thickness defined therebetween. The blade thickness varies between leading edge 138 and trailing edge 140 such that the blade thickness is greatest approximately one third the distance from leading edge 138 to trailing edge 140. Furthermore, each blade 116 may include at least one are of surface roughness to retain the airflow on blade and improve efficiency. Specifically, the pressure side of blade 116 may have one surface roughness, and the suction side of blade 116 may include a different surface roughness. Additionally, the surface roughness may vary between root 156 and tip 158 on the same side of blade 116. Surface roughness can include either protrusions extending upward from blade 116, or may include dimples that are formed in the surface of blade 116.

The implementations described herein relate to an electric motor assembly for moving air in refrigeration equipment and other applications. The electric motor assembly includes an electric motor, a fan assembly coupled to the electric motor and configured to rotate therewith about an axis, and a shroud coupled to the electric motor and extending about the fan assembly. The shroud includes a central hub coupled to the electric motor, an inlet ring, and a plurality of arms extending between the central hub and the inlet ring. Each arm of the plurality of arms includes a curved radial portion extending from the central hub and a planar axial portion extending from the radial portion to the inlet ring. The fan assembly includes a hub including a cylindrical portion and an inlet surface coupled to an inlet end of the cylindrical portion. The fan assembly also includes a plurality of blades coupled to an outer periphery of the cylindrical portion, wherein the inlet surface is tapered to direct an inlet airflow toward the plurality of blades. An outlet end of the hub includes a core ring, a first inner ring circumscribing the core ring, and a first plurality of circumferentially-spaced ribs extending between the core ring and the first inner ring. The hub also includes a second inner ring circumscribing the first inner ring and a second plurality of circumferentially-spaced ribs extending between the first inner ring and the second inner ring.

The electric motor assembly described herein delivers an increased airflow at a higher efficiency with a lower noise level than other known air moving assemblies. The shroud arms are curved and swept in the direction of the airflow to allow the air to more easily pass through to reduce turbulence and improve efficiency. Also, the shroud arms are spaced to reduce blade tones. Similarly, the hub inlet surface is tapered to guide the incoming airflow into the blades at a predetermined angle to increase the amount of air flowing through the fan assembly. Additionally, the hub includes pluralities or ribs and rings that provide structural support to the fan assembly to maintain the fan assembly in position on the rotor and prevent vibrations to result in a reduced noise level. Moreover, the fan assembly is easily replaceable. Furthermore, the electric motor assembly described herein occupies a smaller volume than other known air moving assemblies and therefore allows a user to utilize smaller refrigeration equipment to take up less floor space. Additionally, the smaller size of the electric motor assembly described herein provides additional space within the refrigeration equipment to place products for sale.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fan hub for use in a fan assembly configured to rotate about an axis, said fan hub comprising:
- a core ring;
- a first inner ring circumscribing said core ring;
- a first plurality of circumferentially-spaced ribs extending between said core ring and said first inner ring, wherein the first plurality of ribs consists of ribs which are spaced about the entire circumferences of the core ring and the first inner ring;
- a second inner ring circumscribing said first inner ring; and
- a second plurality of circumferentially-spaced ribs extending between said first inner ring and said second inner ring, wherein the second plurality of ribs consists of ribs which are spaced about the entire circumferences of the first inner ring and the second inner ring, wherein the number of ribs of said first plurality of ribs is equal to the number of ribs of said second plurality of deformable ribs, wherein the second plurality of ribs is located radially outwardly of the first plurality of ribs, wherein said first plurality of ribs is circumferentially offset from said second plurality of deformable ribs;
- wherein said second plurality of deformable ribs facilitate balancing said fan assembly.

2. The fan hub in accordance with claim 1, wherein each rib of said first plurality of ribs comprises a first radial length, and wherein each rib of said second plurality of ribs comprises a second radial length greater than the first radial length.

3. The fan hub in accordance with claim 2, wherein the second radial length is at least twice the first radial length.

4. The fan hub in accordance with claim 1, wherein at least one rib of said second plurality of deformable ribs comprises a rib void, said rib void comprising removed material to facilitate balancing said fan assembly.

5. The fan hub in accordance with claim 1, wherein each rib of said first plurality of ribs is connected to said first inner ring approximately midway between adjacent ribs of said second plurality of deformable ribs.

6. The fan hub in accordance with claim 1, further comprising an outer ring circumscribing said second inner ring to define a radial gap therebetween, wherein said radial gap forms a continuous circle about said second inner ring.

7. The fan hub in accordance with claim 6, wherein said radial gap is configured to receive at least one balancing weight.

8. A electric motor assembly comprising:
- an electric motor; and
- a fan assembly coupled to said electric motor and configured to rotate about an axis, said fan assembly comprising:
  - a hub comprising,
    - a core ring;
    - a first inner ring circumscribing said core ring;
    - a first plurality of circumferentially-spaced ribs extending between said core and said first inner ring, wherein the first plurality of ribs consists of ribs which are spaced about the entire circumferences of the core ring and the first inner ring;
    - a second inner ring circumscribing said first inner ring; and
    - a second plurality of circumferentially-spaced deformable ribs to facilitate balancing said fan assembly, said second plurality of deformable ribs extending between said first inner ring and said second inner ring, wherein the second plurality of ribs consists of ribs which are spaced about the entire circumferences of the first inner ring and the second inner ring, wherein the number of ribs of said first plurality of ribs is equal to the number of ribs of said second plurality of deformable ribs, wherein the second plurality of ribs is located radially outwardly of the first plurality of ribs, wherein said first plurality of ribs is circumferentially offset from said second plurality of deformable ribs; and
  - a plurality of circumferentially-spaced blades coupled to an outer periphery of said hub.

9. The electric motor assembly of claim 8, wherein the quantity of ribs of said second plurality of deformable ribs is equal to a quantity of blades of said plurality of blades.

10. The electric motor assembly of claim 8, wherein each rib of said second plurality of deformable ribs is aligned with a circumferential midpoint of a corresponding blade of said plurality of blades along said outer periphery.

11. The electric motor assembly of claim 8 further comprising at least one alignment device extending from said first inner ring.

12. The electric motor assembly of claim 11, wherein said electric motor comprises a rotor assembly comprising at least one alignment opening, wherein said at least one alignment device is configured to mate with at least one alignment opening.

13. The electric motor assembly in accordance with claim 8, further comprising an outer ring circumscribing said second inner ring, wherein said outer ring comprises a first axial height and said second inner ring comprises a second axial height less than the first axial height.

14. The electric motor assembly in accordance with claim 13, wherein said outer ring comprises a first radial thickness and said second inner ring comprises a second radial thickness.

15. A fan hub for use in a fan assembly configured to rotate about an axis, said fan hub comprising:
- a core ring;
- a first inner ring circumscribing said core ring;
- a first plurality of circumferentially-spaced ribs extending between said core ring and said first inner ring, wherein the first plurality of ribs consists of ribs which are spaced about the entire circumferences of the core ring and the first inner ring;
- a second inner ring circumscribing said first inner ring; and
- a second plurality of circumferentially-spaced deformable ribs extending between said first inner ring and said second inner ring, wherein the second plurality of ribs consists of ribs which are spaced about the entire circumferences of the first inner ring and the second inner ring, wherein the number of ribs of said first plurality of ribs is equal to the number of ribs of said second plurality of deformable ribs, wherein the second plurality of ribs is located radially outwardly of the first plurality of ribs, wherein said first plurality of ribs is circumferentially offset from said second plurality of deformable ribs;

wherein at least on rib of said second plurality of deformable ribs comprises a rib void, said rib void comprising removed material to facilitate balancing said fan assembly.

* * * * *